(12) United States Patent
Chan et al.

(10) Patent No.: US 9,791,644 B2
(45) Date of Patent: Oct. 17, 2017

(54) DATA BUS-IN-A-BOX (BIB) SYSTEM DESIGN AND IMPLEMENTATION

(71) Applicant: THE BOEING COMPANY, Chicago, IL (US)

(72) Inventors: Eric Y. Chan, Chicago, IL (US); Tuong K. Truong, Chicago, IL (US); Dennis G. Koshinz, Chicago, IL (US); Henry B. Pang, Chicago, IL (US); William E. Lawrence, Chicago, IL (US); Clete M. Boldrin, Chicago, IL (US)

(73) Assignee: The Boeing Company, Chicago, IL (US)

( * ) Notice: Subject to any disclaimer, the term of this patent is extended or adjusted under 35 U.S.C. 154(b) by 88 days.

(21) Appl. No.: 14/533,865

(22) Filed: Nov. 5, 2014

(65) Prior Publication Data

US 2016/0124169 A1  May 5, 2016

(51) Int. Cl.
*G02B 6/42* (2006.01)
*G02B 6/245* (2006.01)
(Continued)

(52) U.S. Cl.
CPC ........ *G02B 6/4245* (2013.01); *B32B 37/1284* (2013.01); *B32B 37/142* (2013.01);
(Continued)

(58) Field of Classification Search
CPC ............ B32B 2307/40; B32B 2457/00; B32B 2551/00; B32B 38/0004; B32B 38/10;
(Continued)

(56) References Cited

U.S. PATENT DOCUMENTS 4,545,077 A * 10/1985 Drapala .................... G02F 3/00
                                                          398/60
4,650,276 A    3/1987 Lanzisera et al.
(Continued)

FOREIGN PATENT DOCUMENTS

DE    8211582 U1    8/1982
EP    0161683 A2   11/1985
(Continued)

OTHER PUBLICATIONS

Extended European Search Report, EU Patent Application No. 15191230.0-1504 (which corresponds to related U.S. Appl. No. 14/533,715), dated Apr. 18, 2016.
(Continued)

*Primary Examiner* — Peter Radkowski
(74) *Attorney, Agent, or Firm* — Haynes and Boone, LLP

(57) ABSTRACT

Systems, methods, and apparatus for a data bus-in-a-box (BiB) are disclosed. The system involves an electrical box, and at least one optical connector located on the box. The system further involves at least one mother board housed inside of the box, and comprising a transmit side comprising at least one transmit optical media converter (OMC) tile, and a receive side comprising at least one receive OMC tile. Also, the system involves first receive optical fibers that are each connected from at least one receive OMC tile to a receive coupler; and a second receive optical fiber connected from the receive coupler to one of the optical connectors. Further, the system involves first transmit optical fibers that are each connected from at least one transmit OMC tile to a transmit coupler; and a second transmit optical fiber connected from the transmit coupler to at least one of the optical connectors.

18 Claims, 6 Drawing Sheets

(51) Int. Cl.

| | | |
|---|---|---|
| *G02B 6/32* | (2006.01) | |
| *B32B 37/18* | (2006.01) | |
| *B32B 37/14* | (2006.01) | |
| *B32B 37/12* | (2006.01) | |
| *B32B 38/00* | (2006.01) | |
| *B32B 38/10* | (2006.01) | |
| *G02B 6/44* | (2006.01) | |
| *H04B 10/40* | (2013.01) | |
| *G02B 6/28* | (2006.01) | |
| *G02B 6/38* | (2006.01) | |
| *G02B 6/43* | (2006.01) | |

(52) U.S. Cl.
CPC .......... *B32B 37/18* (2013.01); *B32B 38/0004* (2013.01); *B32B 38/10* (2013.01); *G02B 6/245* (2013.01); *G02B 6/28* (2013.01); *G02B 6/32* (2013.01); *G02B 6/3897* (2013.01); *G02B 6/428* (2013.01); *G02B 6/4239* (2013.01); *G02B 6/4246* (2013.01); *G02B 6/4249* (2013.01); *G02B 6/4253* (2013.01); *G02B 6/4255* (2013.01); *G02B 6/4257* (2013.01); *G02B 6/4262* (2013.01); *G02B 6/4263* (2013.01); *G02B 6/4268* (2013.01); *G02B 6/4277* (2013.01); *G02B 6/4293* (2013.01); *G02B 6/43* (2013.01); *G02B 6/4441* (2013.01); *H04B 10/40* (2013.01); *B32B 2307/40* (2013.01); *B32B 2457/00* (2013.01); *B32B 2551/00* (2013.01)

(58) Field of Classification Search
CPC . G02B 6/245; G02B 6/28; G02B 6/32; G02B 6/3897; G02B 6/4239; G02B 6/4245; G02B 6/4246; G02B 6/4249; G02B 6/4253; G02B 6/4255; G02B 6/4257; G02B 6/4262; G02B 6/4263; G02B 6/4268; G02B 6/4277; G02B 6/4278; G02B 6/428; G02B 6/4293; G02B 6/43; G02B 6/4441; H04B 10/40
See application file for complete search history.

(56) References Cited

U.S. PATENT DOCUMENTS

| | | | | |
|---|---|---|---|---|
| 4,779,948 A * | 10/1988 | Wais | .................... | G02B 6/4292 250/227.24 |
| 4,838,641 A | 6/1989 | Morimoto et al. | | |
| 5,039,194 A * | 8/1991 | Block | .................... | H04B 10/50 385/53 |
| 5,069,522 A * | 12/1991 | Block | .................... | H04B 10/50 385/39 |
| 5,109,445 A | 4/1992 | Jervis | | |
| 5,165,002 A | 11/1992 | Cumberledge et al. | | |
| 5,926,378 A * | 7/1999 | DeWitt | ................ | G06F 13/409 361/788 |
| 6,568,860 B2 * | 5/2003 | Koch | .................... | H01R 9/2675 385/53 |
| 6,631,237 B2 * | 10/2003 | Knudsen | ............. | G02B 6/4452 174/50 |
| 7,023,705 B2 | 4/2006 | Liu et al. | | |
| 7,358,109 B2 | 4/2008 | Gallup et al. | | |
| 7,359,592 B2 * | 4/2008 | Truong | .............. | H04B 10/2581 385/24 |
| 7,433,195 B2 * | 10/2008 | Li | ............................ | H05K 1/18 361/736 |
| 7,518,883 B1 * | 4/2009 | Suitor | ..................... | H04Q 1/08 361/788 |
| 7,660,128 B2 * | 2/2010 | Crews | .................... | H05K 1/182 361/733 |
| 7,661,886 B2 * | 2/2010 | Wang | ................... | G02B 6/4292 385/14 |
| 7,751,717 B2 * | 7/2010 | Hahin | .................. | H04B 10/801 398/135 |
| 8,045,858 B2 * | 10/2011 | Truong | ................... | H04B 10/40 398/154 |
| 8,320,766 B2 * | 11/2012 | Truong | ................ | H04B 10/801 385/88 |
| 8,478,127 B2 | 7/2013 | Chan et al. | | |
| 8,521,032 B2 * | 8/2013 | Truong | ................... | H04B 10/40 398/136 |
| 9,071,357 B1 * | 6/2015 | Shi | ...................... | H04B 10/2575 |
| 9,077,451 B2 * | 7/2015 | Truong | .................. | H04B 10/40 |
| 9,276,335 B2 * | 3/2016 | Fricker | ................ | H01R 12/523 |
| 2002/0125800 A1 * | 9/2002 | Knudsen | ............. | G02B 6/4452 312/223.6 |
| 2006/0067064 A1 * | 3/2006 | Crews | .................... | H05K 1/182 361/761 |
| 2006/0147215 A1 * | 7/2006 | Hahin | .................. | H04B 10/801 398/135 |
| 2007/0178718 A1 * | 8/2007 | Li | ............................ | H05K 1/18 439/65 |
| 2007/0237452 A1 * | 10/2007 | Truong | .............. | H04B 10/2581 385/24 |
| 2010/0021174 A1 * | 1/2010 | Truong | ................... | H04B 10/40 398/101 |
| 2010/0183314 A1 * | 7/2010 | Truong | ................ | H04B 10/801 398/115 |
| 2011/0243566 A1 * | 10/2011 | Truong | ................... | H04B 10/40 398/116 |
| 2013/0322887 A1 | 12/2013 | McColloch | | |
| 2014/0162470 A1 * | 6/2014 | Fricker | ................ | H01R 12/523 439/65 |
| 2015/0268702 A1 * | 9/2015 | Huang | .................... | G06F 1/187 361/679.35 |

FOREIGN PATENT DOCUMENTS

| | | |
|---|---|---|
| EP | 1626300 A1 | 2/2006 |
| WO | 9013838 A1 | 11/1990 |
| WO | 2013097449 A1 | 7/2013 |

OTHER PUBLICATIONS

Concept Overdrive Fiber-Serial Board, available at http://www.conceptoverdrive.com/products/fiber_serial.php, available on Oct. 23, 2013.

Avago Technologies Fiber Optic Transmitter and Receiver for 1 mm POF, available at http://mouser.com/ds/2/38/AV02-3690EN+DS+AFBR-1644Z+29Jun2012-216547.pdf, available on Jun. 29, 2012.

Extended European Search Report, EU Patent Application No. 15193003.9-1553, dated Sep. 23, 2016.

* cited by examiner

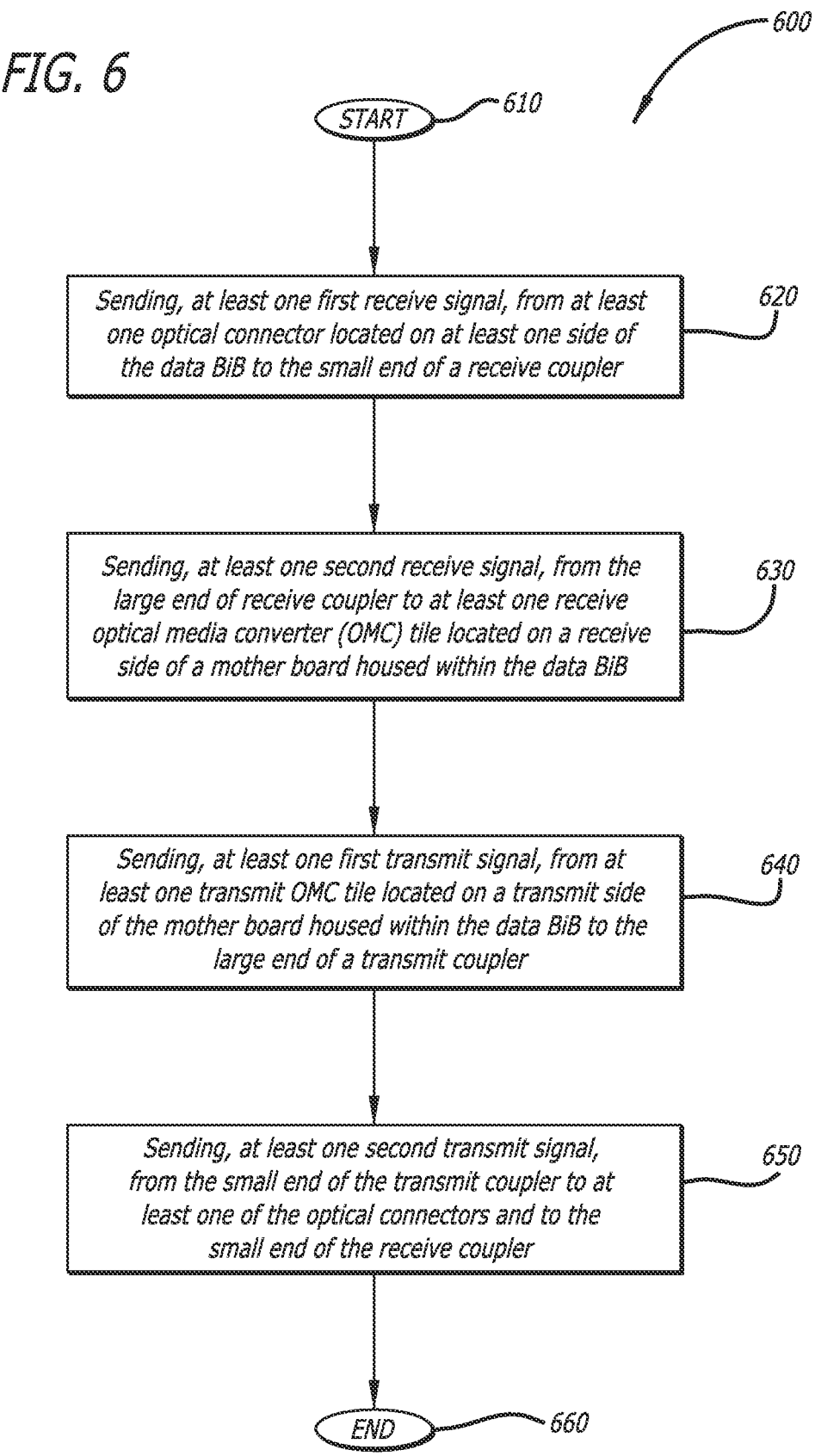

DATA BUS-IN-A-BOX (BIB) SYSTEM DESIGN AND IMPLEMENTATION

CROSS-REFERENCE TO RELATED APPLICATION

This application is related to U.S. patent application Ser. No. 14/533,715, filed Nov. 5, 2014, titled Low Cost, Connectorless, Ruggedized Small Form Factor Optical Sub-Assembly (OSA) and Data Bus-in-a-Box (BiB), by Chan, et al.

FIELD

The present disclosure relates to data buses. In particular, it relates to a data bus-in-a-box (BiB) system design and implementation.

BACKGROUND

Currently, some system data bus architectures (e.g., an ARINC plastic optical fiber (POF) 629 data bus) employed in aircraft (e.g., a modern aircraft) require an individually packaged optical media converter (OMC) for each channel. They also require individually packaged passive optical star couplers. These individually packaged units are interconnected together by fully-jacketed aircraft POF cables that are subjected to abuse during installation. The connectors required for these packages are not only heavy, bulky, and costly, but also add significant optical attenuation to the system's optical power budget. The optical media converters (OMCs) and optical star couplers also require custom designed support brackets and rails to mount them to the aircraft structure members. Each OMC and optical star coupler must be manufactured and tested individually, thereby incurring much time and cost. When an OMC fails, an aircraft mechanic must remove it and install a new OMC in its place, which requires additional time and cost. As such, there is a need for an improved data bus architecture design.

SUMMARY

The present disclosure relates to a method, system, and apparatus for a data bus-in-a-box (BiB) design and implementation. In one or more embodiments, a system for a data BiB to perform electrical to optical conversion and optical to electrical conversion involves an electrical box, and at least one optical connector located on at least one side of the box. The system further involves at least one mother board housed inside of the box. The mother board(s) comprises a transmit side and a receive side; where the transmit side comprises at least one transmit optical media converter (OMC) tile to perform electrical to optical conversion, and the receive side to perform optical to electrical conversion comprises at least one receive OMC tile. Also, the system comprises a plurality of first receive optical fibers, where each of the first receive optical fibers is connected from at least one receive OMC tile to the large end of a receive coupler. In addition, the system involves a second receive optical fiber, where the second receive optical fiber is connected from the small end of the receive coupler to at least one optical connector. Additionally, the system involves a plurality of first transmit optical fibers, where each of the first transmit optical fibers is connected from at least one transmit OMC tile to the large end of a transmit coupler. Further, the system involves a second transmit optical fiber, where the second transmit optical fiber is connected from the small end of the transmit coupler to at least one optical connector. Further, the system involves a third transmit optical fiber, where the third transmit optical fiber is connected from the small end of the transmit coupler to the small end of the receive coupler.

In one or more embodiments, the system further involves at least one electrical connector located on at least one of the sides of the box. Further, the system involves at least one electrical wire connected from the mother board to at least one electrical connector. In some embodiments, each electrical connector transmits the electrical data signal from a line replaceable unit (LRU) to the input of at least one transmitter OMC tile in the data BiB. Each electrical connector will also receive electrical signals on the data bus from at least one receiver OMC tile, which performs the optical to electrical conversion of the optical data from the receive coupler inside of the data BiB.

In at least one embodiment, a data BiB to perform electrical to optical conversion and optical to electrical conversion involves at least one optical connector located on at least one side of the data BiB. The data BiB further involves at least one mother board housed inside of the data BiB. The mother board comprises a transmit side and a receive side; where the transmit side comprises at least one transmit optical media converter (OMC) tile to perform electrical to optical conversion, and the receive side comprises at least one receive OMC tile to perform optical to electrical conversion. Also, the data BiB involves a plurality of first receive optical fibers, where each of the first receive optical fibers is connected from at least one receive OMC tile to a receive coupler. In addition, the data BiB involves a second receive optical fiber, where the second receive optical fiber is connected from the receive coupler to at least one optical connector. Additionally, the data BiB involves a plurality of first transmit optical fibers, where each of the first transmit optical fibers is connected from at least one transmit OMC tile to a transmit coupler. Further, the data BiB comprises a second transmit optical fiber, where the second transmit optical fiber is connected from the transmit coupler to at least one optical connector. Further, the system involves a third transmit optical fiber, where the third transmit optical fiber is connected from the small end of the transmit coupler to the small end of the receive coupler.

In one or more embodiments, the data BiB further comprises at least one electrical connector located on at least one of the sides of the data BiB. Further, the data BiB comprises at least one electrical wire connected from the mother board to at least one electrical connector.

In at least one embodiment, at least one electrical connector and at least one optical connector are located on the same side of the data BiB. In some embodiments, at least one electrical connector and at least one optical connector are located on different sides of the data BiB.

In one or more embodiments, the transmit OMC tiles comprise at least one spare transmit OMC tile and the receive OMC tiles comprise at least one spare receive OMC tile; the electrical connectors comprise at least one spare electrical connector; and when at least one of the transmit OMC tiles and/or the receive OMC tiles fails, at least one spare transmit OMC tile and/or at least one space receive OMC tile is connected to at least one spare electrical connector.

In one or more embodiments, the receive coupler is a tapered star coupler, with a small end and a large end. In some embodiments, the transmit coupler is a tapered star coupler, with a small end and a large end. In some embodiments, there is at least one fiber connecting the tapered end of the transmit coupler to the tapered end of the receive coupler.

In at least one embodiment, at least a portion of the interior of the data BiB comprises thermally conductive foam.

In one or more embodiments, each of the transmit OMC tiles comprises an optical sub-assembly (OSA). In some embodiments, each of the receive OMC tiles comprises an optical sub-assembly (OSA).

In at least one embodiment, the data BiB is a 3 MCU sized box or a 4 MCU sized box.

In one or more embodiments, the mother board is a double-sided printed circuit board (PCB).

In at least one embodiment, the data BiB further comprises light emitting diode (LED) failure indicator lighting located on at least one side of the data BiB.

In one or more embodiments, the mother board is a copper core board. In some embodiments, the mother board comprises an aluminum back plate.

In at least one embodiment, the transmit coupler is manufactured from a multi-core plastic optical fiber (POF). In some embodiments, the receive coupler is manufactured from a multi-core plastic optical fiber (POF).

In one or more embodiments, the data BiB is environmentally sealed for moisture and contamination prevention.

In at least one embodiment, all of the OMC tiles (i.e. the transmit OMC tiles and the receive OMC tiles) are electrically isolated from each other.

In one or more embodiments, when at least one of the OMC tiles (i.e. the transmit OMC tiles and the receive OMC tiles) fails, the remaining OMC tiles are not affected by the failure.

In at least one embodiment, the data BiB further comprises light emitting diode (LED) health indicator lighting located on at least one side of the data BiB to indicate at least one failed OMC tile is swapped with at least one healthy spare OMC tile successfully.

In one or more embodiments, the data BiB further comprises at least one spare transmit OMC tile, at least one spare receive OMC tile, and/or at least one spare electrical connector.

In one or more embodiments, the data BiB obtains power from signal pins of an external electrical line replaceable unit (LRU) connector.

In at least one embodiment, a method for communication using a data BiB involves sending, at least one first receive signal, from at least one optical connector located on at least one side of the data BiB to the small end of a receive coupler. The method further involves sending, at least one second receive signal, from the large end of the receive coupler to at least one receive optical media converter (OMC) tile located on a receive side of a mother board housed within the data BiB. Also, the method involves sending, at least one first transmit signal, from at least one transmit OMC tile located on a transmit side of the mother board housed within the data BiB to the large end of a transmit coupler. Further, the method involves sending, at least one second transmit signal, from the small end of the transmit coupler to at least one of the optical connectors and to the small end of the receive coupler also.

The features, functions, and advantages can be achieved independently in various embodiments of the present disclosure or may be combined in yet other embodiments.

DRAWINGS

These and other features, aspects, and advantages of the present disclosure will become better understood with regard to the following description, appended claims, and accompanying drawings where:

FIG. 6 depicts a flow chart depicting the disclosed method for communication using a data BiB, in accordance with at least one embodiment of the present disclosure.

DESCRIPTION

Figure 1:
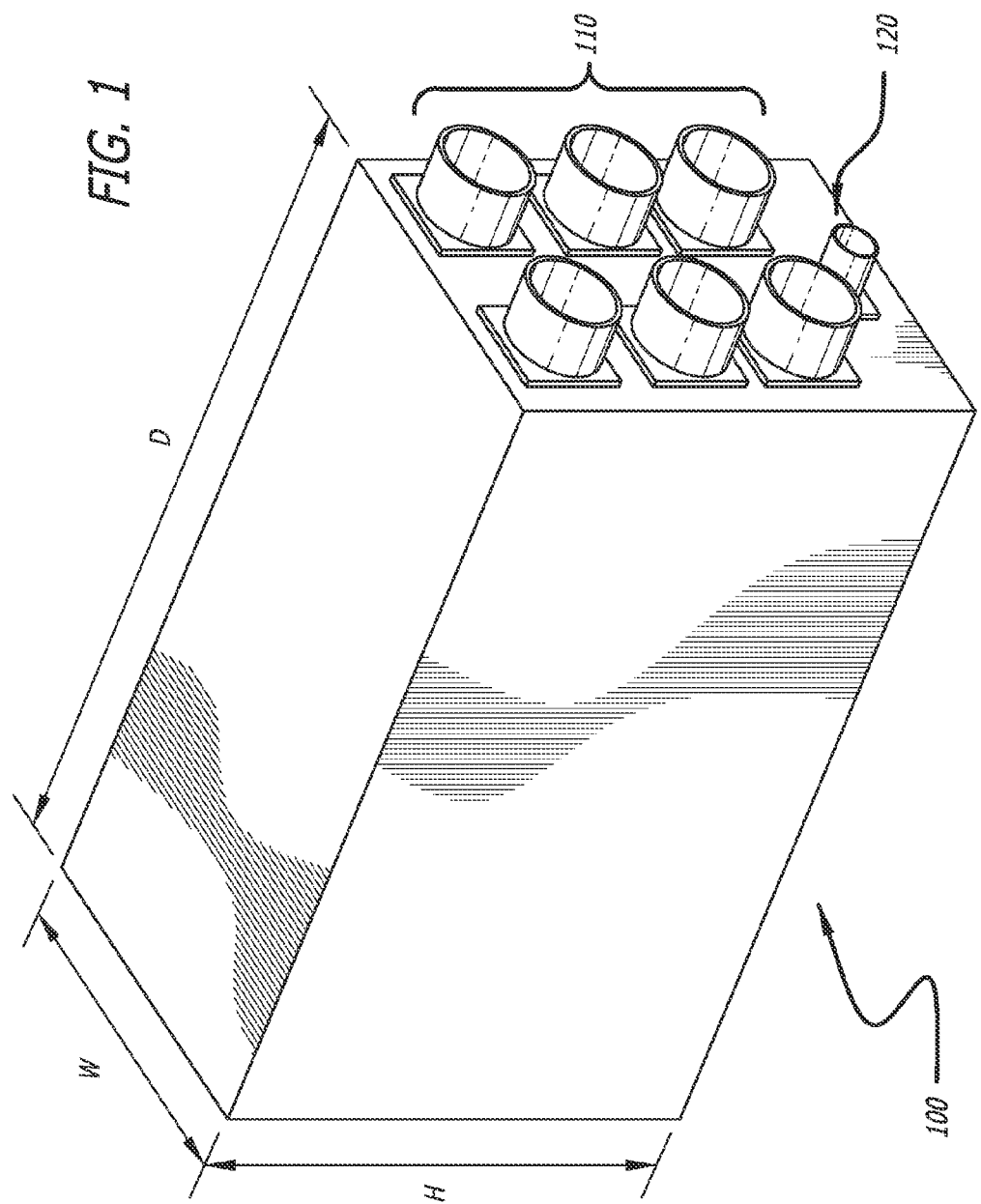
FIG. 1 is a diagram showing an external view of the disclosed data bus-in-a-box (BiB) system design, in accordance with at least one embodiment of the present disclosure.

The methods and apparatus disclosed herein provide an operative system for a data bus-in-a-box (BiB) system design and implementation. The disclosed system design integrates all of the optical media converters (OMCs) and couplers (e.g., optical star couplers) of the data bus in a single box (i.e. the data BiB), thereby allowing for a reduction in parts and installation cost, which is crucial for aircraft production. By implementing all of the OMCs and the couplers in a single box, there is a reduction in size, weight, power, and cost for the data bus implementation. Additional spare OMCs are incorporated within the data BiB to provide for effective redundancy in case of an OMC malfunction in the data BiB, thereby assuring for high reliability of the aircraft's system bus operation.

In one or more embodiments, the present disclosure involves the design and implementation of a data BiB for a POF 629 system bus used in a modern aircraft for replacement of the currently employed copper ARINC 629 electrical data bus for reduction in size, weight, cost and power. However, it should be noted that the disclosed data BiB may be employed for different data buses for different aircraft or other vehicles or implementations. In at least one embodiment, the disclosed data BiB employs an industry standard 4 MCU-sized line replaceable unit (LRU) box that is ready to slide onto an existing avionic equipment bay, requiring no special mounting provision. Instead of using fully qualified aircraft optical cable, industry standard plastic optical fiber (POF) can be used inside of the protected LRU box enclosure. Instead of building and testing each OMC separately, all OMC channels within the data bus are built on a single double-sided printed circuit board (PCB) (e.g., mother board), thereby affording a single automated operation. The single PCB is partitioned into an array of tiles, with all of the transmitting tiles on one side of the PCB and all of the receiving tiles on the other side of the PCB.

The disclosed data BiB design has three main advantages. The first main advantage is the ease of routing optical fiber cable separately for the transmit and the receive OMCs. The second main advantage is the minimization of crosstalk between the transmit and the receive circuitry. And, the third main advantage is the increase in PCB real estate for other components because the transmit and receive OMCs are on different sides of the PCB.

Each optical star coupler on the data BiB has a multi-channel connection for the OMC tiles inside of the BiB and for the OMC in an external BiB. Locally, although any single channel failure only affects that channel and does not affect the rest of the channels or the overall operation of the data bus, there are built-in spare channels (i.e. spare OMCs) on the PCB and built-in spare connections on the optical star couplers in the data BiB to improve dispatch reliability. Each spare coupler channel is connected to a spare OMC on the PCB (e.g., motherboard). When any one channel or OMC fails, light emitting diodes (LEDs) located on the front of the box will change color or illuminate, to indicate to the mechanics to simply move the as-shipped wiring from an active connector to a spare connector to restore full system operation. In some embodiments, the data BiB includes light emitting diode (LED) indicator lighting located on at least one side of the data BiB. The LED indicator lighting may employ colored light emitting diodes (LEDs) to indicate the health of the OMCs that are installed (e.g., one LED color may be used to indicate an OMC failure and a different LED color may be used to indicate that a failed OMC is successfully swapped with a healthy spare OMC).

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with, and that the system described herein is merely one example embodiment of the present disclosure.

For the sake of brevity, conventional techniques and components related to data buses, and other functional aspects of the system (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

In one or more embodiments, the present disclosure involves replacing copper bus cables, quad stub cables, couplers, and complex coupler panel assemblies for ARINC 629 system buses currently employed in modern aircraft with ARINC POF 629 optical data BiBs. Currently, as previously mentioned above, the POF 629 data bus architecture requires an individually packaged optical media converter (OMC) for each channel. It also requires individually packaged passive optical star couplers. These individually packaged units are interconnected together by fully jacketed aircraft POF cables that are subjected to abuse during installation. The ARINC connectors required for these packages are not only heavy, bulky, and costly, but also add significant optical attenuation to the system's optical power budget. The OMCs and optical star couplers also require custom designed support brackets and rails to mount them to the aircraft structure members. Each OMC and optical star coupler must be manufactured and tested individually, thereby incurring much time and cost. When an OMC fails, aircraft mechanics must remove it and install a new OMC in its place, which requires additional time and cost.

The disclosed data BiB architecture eliminates all individual packages for the OMCs and the optical star couplers. It integrates all these devices within a small line replaceable unit (LRU) box, while retaining electrical and optical isolation between the channels. Since the power supply is superimposed on the data lines for each OMC channel, there is no common power supply (e.g., power is obtained from an external supply, such as from signal pins of an external electrical line replaceable unit (LRU) connector), and no single-point electronic or electrical failure that can shut the data bus down.

The disclosed data BiB utilizes an industry standard 4 MCU-sized LRU box that is ready to slide onto an existing avionic equipment bay, thereby requiring no special mounting provision. Instead of fully qualified aircraft optical cable being utilized, industry standard POF fiber can be used inside of the protected LRU box enclosure. Instead of building and testing each OMC separately, all OMC channels within a data BiB are built on a single double-sided printed circuit board (PCB), affording a single automated operation. The single PCB is partitioned into array of tiles, with all transmitting tiles on one side of the PCB and all receiving tiles on the other side of the PCB.

FIG. 1 is a diagram showing an external view of the disclosed data BiB 100 system design, in accordance with at least one embodiment of the present disclosure. The data BiB 100 includes six 5-channel circular 38999 electrical connectors 110 and one 2-channel 38999 POF optical connector 120. It should be noted that in other embodiments, the data BiB 100 may contain more or less than six electrical connectors 110 as shown, and may contain more than one optical connector 120 as shown. In addition, it should be noted that in other embodiments, various different types of electrical connectors 110 other than circular 38999 electrical connectors may be employed by the disclosed data BiB 100. Additionally, it should be noted that in other embodiments, various different types of optical connectors 120 other than circular 38999 optical connectors may be employed by the disclosed data BiB 100.

The data BiB 100 contains 30 OMCs (25 OMCs plus 5 spare OMCs) (refer to FIG. 2), which are housed within a compact 4 MCU sized avionics box 100 with dimensions of 4.88" W×7.64" H×12.76" D. The box 100, at the same time, achieves high reliability and ruggedness standards that are required by the commercial airplane's avionics environment. It should be noted that in other embodiments, various sized boxes other than a 4 MCU sized box may be employed for the data BiB 100. For example, in some embodiments, a 3 MCU sized box may be employed for the data BiB 100.

Six 5-channel 38999 electrical connectors 110 and one 2-channel POF connector 120 are shown to be located on the one side of the data BiB 100. Each OMC inside of the data BiB 100 of the POF 629 system bus architecture needs to provide a minimum of a 54 decibels (dB) power budget over an operating temperature range of −40° Celsius (C) to 85° C., and maintain this performance over twenty (20) years of operating life time under stringent avionics environments, which include high vibration, humidity, and contamination.

The data BiB box 100 is environmental sealed, before final installation in the airplane, for moisture and contamination prevention. In addition, the data BiB box 100 is ruggedized to withstand mechanical shock and vibration in a commercial airplane environment.

Figure 2:
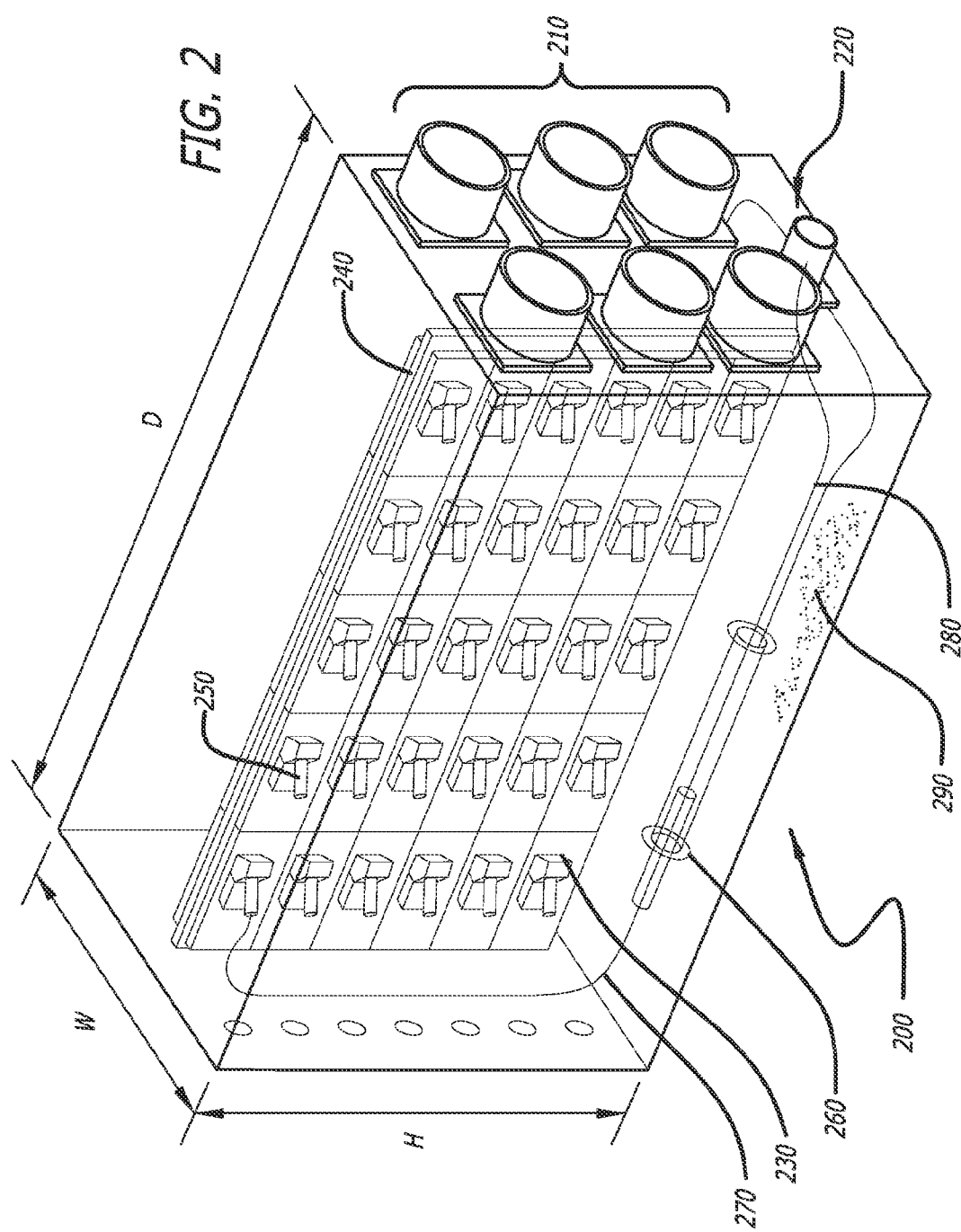
FIG. 2 is diagram showing an internal view of the disclosed data BiB system design and assembly, in accordance with at least one embodiment of the present disclosure.

FIG. 2 is diagram showing an internal view of the disclosed data BiB 200 system design and assembly, in accordance with at least one embodiment of the present disclosure. This figure shows the internal three-dimensional (3D) view of 4 MCU sized data BiB 200. Additionally, the figure shows the arrangement and location of thirty (30) OMC PCB tiles 230 on a PCB (e.g., mother board) 240. It should be noted that in other embodiments, the PCB 240 may comprise more or less than 30 OMC PCB tiles 230 as is shown. Each OMC tile 230 includes a tilted optical sub-assembly (OSA) 250. Each OSA 250 on the OMC tiles 230 is connected to a POF star coupler 260 via a POF 270. In addition, each POF star coupler 260 is connected to the 2-channel 38999 optical connector via a POF 280.

Six 38999 circular electrical connectors 210 are located near the PCB (e.g., mother board) 240 edge to facilitate making electrical connections to the PCB 240. In this example, each electrical connector 210 is connects to five OMCs. And, each electrical connector 210 has twenty (20) electrical pins that are active. It should be noted that in one or more embodiments, each electrical connector 210 may have more or less than 20 electrical pins that are active. The electrical pins are spaced sufficiently apart to minimize cross talk between the active pins.

In one or more embodiments, thermally conductive foam material 290 is used to fill the space between the center PCB 240 to the wall of the data BiB 200 to enhance thermally conductivity. In one or more embodiments, the PCB (e.g., mother board) 240 may comprise a copper core board or a board with an aluminum back plate for enhancement of thermal conductivity.

Figure 3:
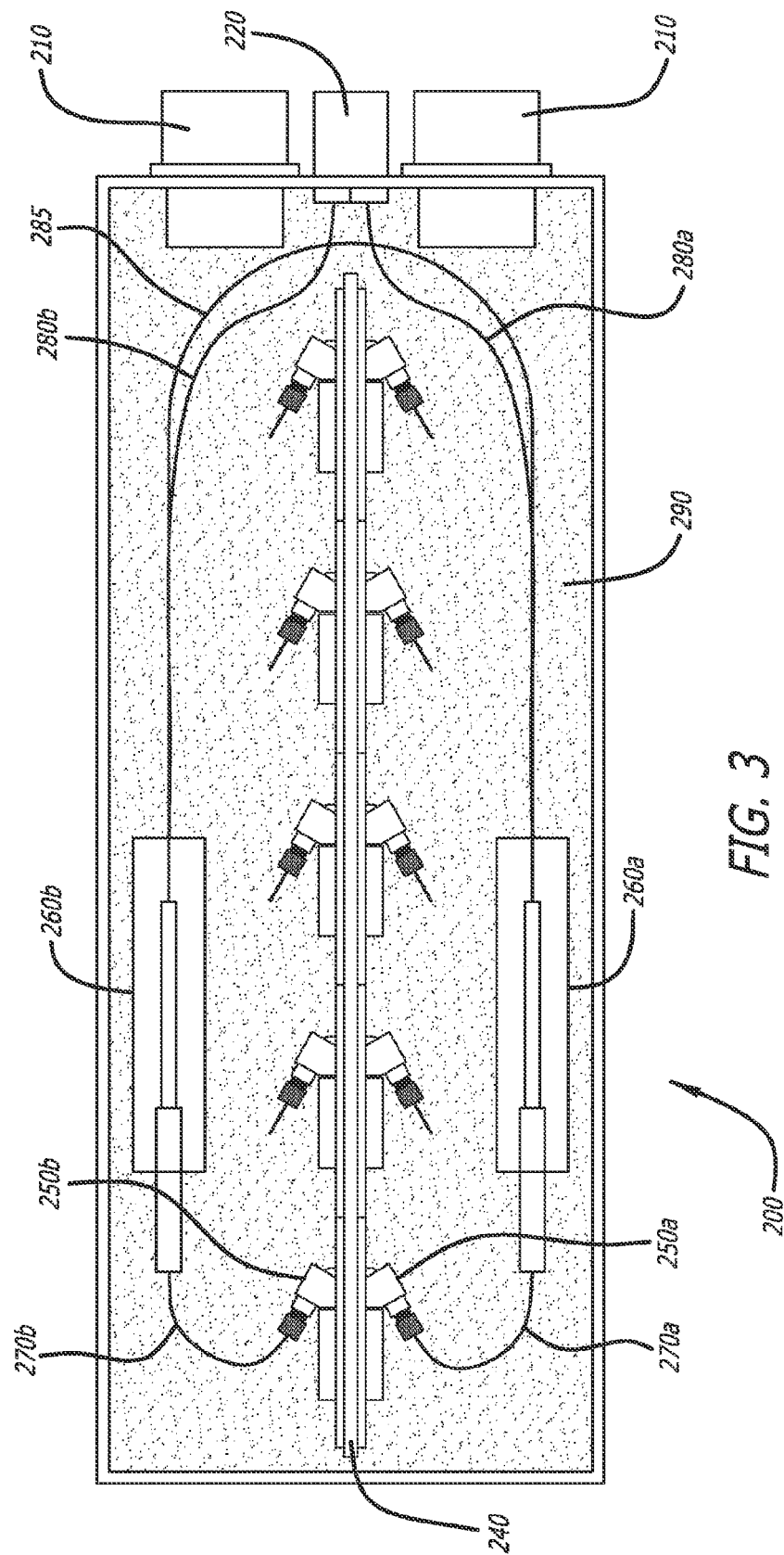
FIG. 3 is a diagram showing an internal top view of the disclosed data BiB of FIG. 2, in accordance with at least one embodiment of the present disclosure.

FIG. 3 is a diagram showing an internal top view of the disclosed data BiB 200 of FIG. 2, in accordance with at least one embodiment of the present disclosure. In this figure, the arrangement and locations of the center PCB 240; the tilted optical sub-assemblies (OSAs) 250a, 250b; the POF star couplers 260a, 260b; the POF connections 270a, 270b from the POF star couplers 260a, 260b to the OSAs 250a, 250b; and the POF connections 280a, 280b from the POF star couplers 260a, 260b to the optical connector 220 are shown. Additionally, POF 285 is shown to be connected from POF star coupler 260a (e.g., a receive coupler) to POF star coupler 260b (e.g., a transmit coupler). The arrangement of this layout minimizes the bending of the POF 270a, 270b, 280a, 280b, 285 within the tight space of the data BiB 200. The POF 270a, 270b, 280a, 280b, 285 bend radius within the data BiB 200 will not introduce large optical loss due to the bending. In addition, it should be noted that the POF 270a, 270b, 280a, 280b, 285 and the POF star couplers 260a, 260b are manufactured from a multi-core POF, which has a very high tolerance to tight bending.

Figure 4:
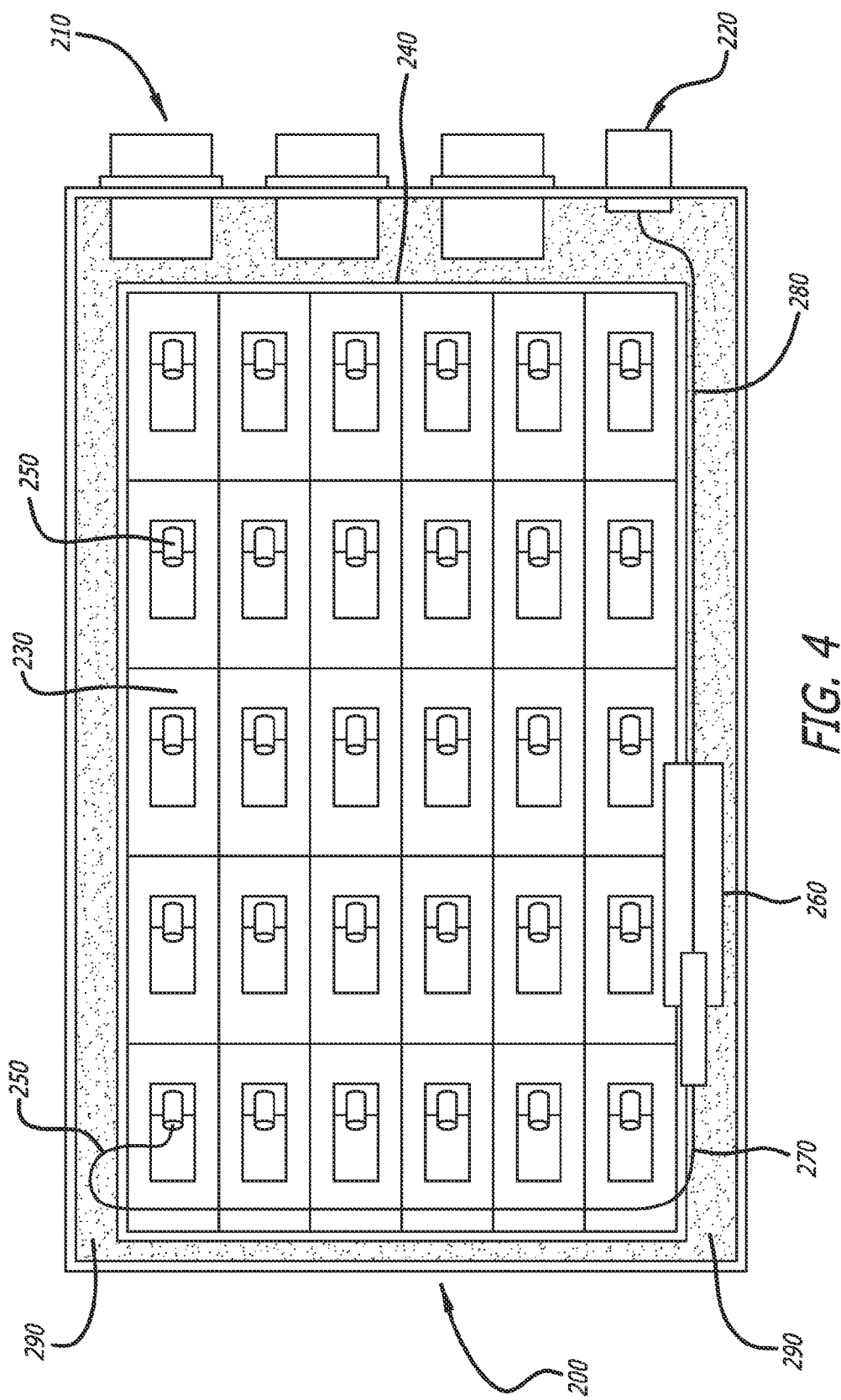
FIG. 4 is a diagram showing an internal side view of the disclosed data BiB of FIG. 2, in accordance with at least one embodiment of the present disclosure.

FIG. 4 is a diagram showing an internal side view of the disclosed data BiB 200 of FIG. 2, in accordance with at least one embodiment of the present disclosure. In this figure, the arrangement of the 30 OMC tiles 230 with the tilted OSAs 250 on the PCB (e.g., mother board) 240 is shown. In addition, the connection of a POF 270 from a POF star coupler 260 to a tilted OSA 250 shows the POF 270 having a small bend radius. The connection of the POF 280 from the POF star coupler 260 to the 2-channel 38999 optical connector 220 is also shown.

The 38999 electrical connectors 210 are located close to the edge of the PCB (e.g., mother board) 240 to facilitate electrical connections from the connectors 210 to the PCB 240. The connections from the PCB 240 to the electrical connectors 210 can be accomplished by employing, for example, a card edge connector or a flexcircuit with a connector to the PCB 240.

Figure 5:
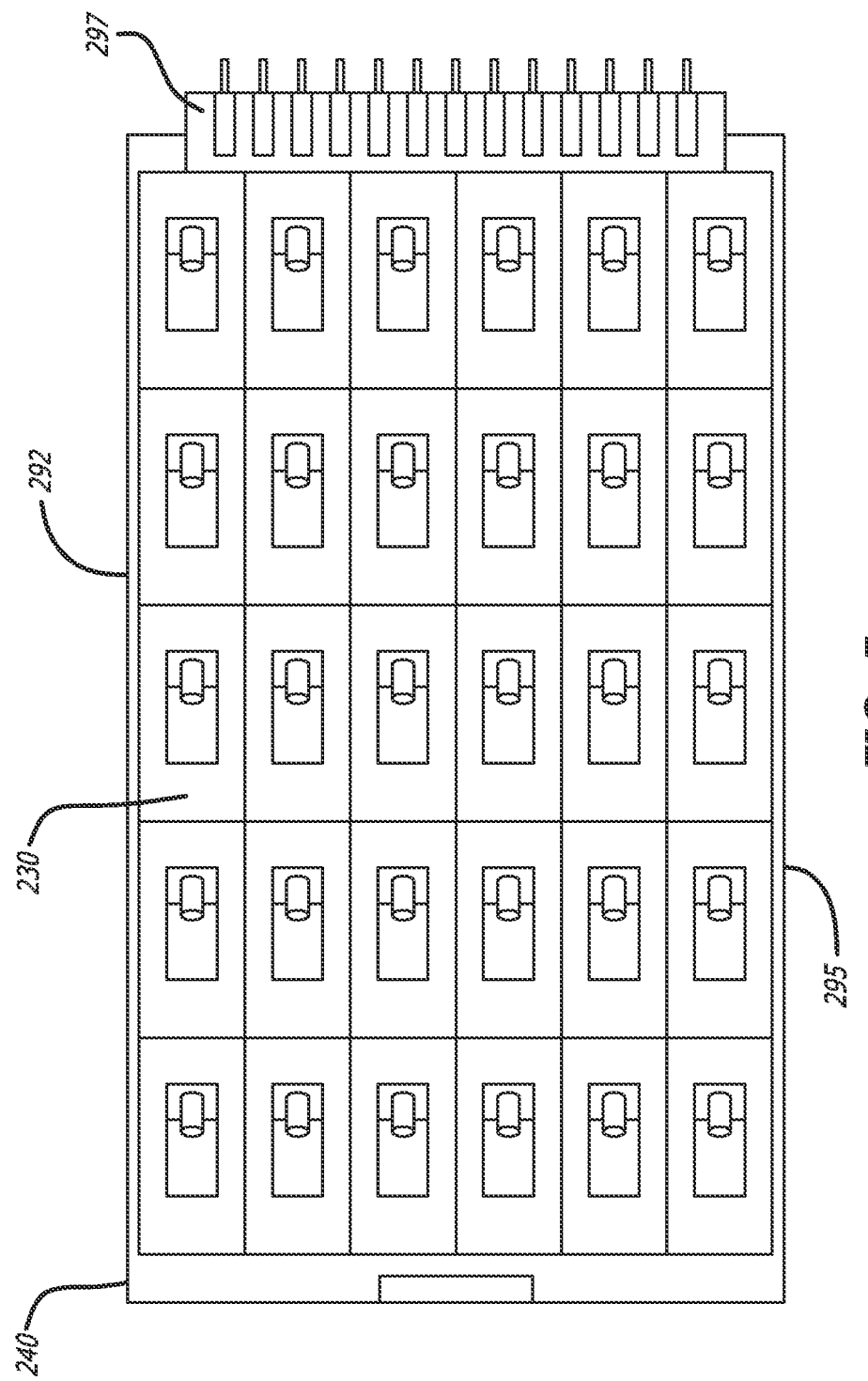
FIG. 5 is a diagram showing an exemplary printed circuit board (PCB) (e.g., mother board) of the disclosed data BiB of FIG. 2, in accordance with at least one embodiment of the present disclosure.

FIG. 5 is a diagram showing an exemplary PCB (e.g., mother board) 240 of the disclosed data BiB 200 of FIG. 2, in accordance with at least one embodiment of the present disclosure. This figure shows a conceptual view of the PCB (e.g., mother board) 240 populated with OMC tiles 230 on one side. The PCB 240 is partitioned into an array of OMC tiles 230, with all transmitting tiles 230 (to perform electrical to optical conversion) on one side of the PCB 240 and all receiving tiles 230 (to perform optical to electrical conversion) on the other side of the PCB 240. This design allows for ease of routing of POF separately for transmit and receive, a minimization of crosstalk between the transmit and the receive circuitry, and an increase in PCB 240 real estate for other components.

It should be noted that all of the OMC tiles (i.e. the transmit OMC tiles and the receive OMC tiles) 230 are electrically isolated from each other. In addition, when at least one of the OMC tiles (i.e. the transmit OMC tiles and the receive OMC tiles) 230 fails, the remaining OMC tiles 230 are not affected by the failure (i.e. the failed OMC tile 230 does not affect the communication of the remaining OMC tiles 230 on the data bus).

In one or more embodiments, for example, the dimensions of each OMC PCB tile 230 is 1.2"×2.2" and, as such, the area on both sides (i.e. the transmit side and the receive side) of each OMC tile 230 is 5.28 square inches, which provides sufficient space for the OMC electronic elements and the tilted OSA 250. In one or more embodiments, for example, the dimensions of the PCB (e.g., mother board) 240 are 7.2"×11". Since the side dimensions of a 4 MCU sized box are 7.6"×12.75", the PCB 240 has a margin of 1.75" in depth and 0.4" in height when housed within a 4 MCU sized box.

In one or more embodiments, the PCB (e.g., mother board) 240 includes a top edge guide rail 292 and a bottom edge guide rail 295, which are both used to secure the PCB 240 inside of the data BiB 200. In some embodiments, the PCB 240 includes an edge connector 297, which is used to facilitate electrical connections from the PCB 240 to the electrical connectors 210.

It should be noted that, in one or more embodiments, the transmit OMC tiles 230 comprise at least one spare transmit OMC tile 230 and the receive OMC tiles 230 comprise at least one spare receive OMC tile 230. Also, the electrical connectors 210 comprise at least one spare electrical connector 210. When at least one of the transmit OMC tiles 230 and/or the receive OMC tiles 230 fails, at least one spare transmit OMC tile 230 and/or at least one space receive OMC tile 230 is connected to at least one spare electrical connector 210.

FIG. 6 depicts a flow chart depicting the disclosed method 600 for communication using a data BiB (e.g., the data BiB 200 of FIGS. 2-5), in accordance with at least one embodiment of the present disclosure. At the start of the method 600, at least one first receive signal is sent from at least one optical connector located on one side of the data BiB to the small end of a receive coupler (e.g., a star coupler) 620.

Then, at least one second receive signal is sent from the large end of the receive coupler (e.g., a star coupler) to at least one receive OMC tile located on the receive side of a PCB (e.g., mother board) housed within the data BiB 630. At least one first transmit signal is sent from at least one transmit OMC tile located on the transmit side of the PCB (e.g., mother board) housed within the data BiB to the large end of a transmit coupler (e.g., a star coupler) 640. Then, at least one second transmit signal is sent from the small end of the transmit coupler (e.g., a star coupler) to at least one of the optical connectors and to the small end of the receive coupler 650. Then, the method 600 ends 660.

Although particular embodiments have been shown and described, it should be understood that the above discussion is not intended to limit the scope of these embodiments. While embodiments and variations of the many aspects of the present disclosure have been disclosed and described herein, such disclosure is provided for purposes of explanation and illustration only. Thus, various changes and modifications may be made without departing from the scope of the claims.

Where methods described above indicate certain events occurring in certain order, those of ordinary skill in the art having the benefit of this disclosure would recognize that the ordering may be modified and that such modifications are in accordance with the variations of the present disclosure. Additionally, parts of methods may be performed concurrently in a parallel process when possible, as well as performed sequentially. In addition, more parts or less part of the methods may be performed.

Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A system for a data bus-in-a-box (BiB), the system comprising:
    an electrical box;
    at least one optical connector located on at least one side of the box;
    at least one mother board housed inside of the box, and comprising a transmit side and a receive side, wherein the transmit side comprises at least one transmit optical media converter (OMC) tile to perform electrical to optical conversion, and the receive side comprises at least one receive OMC tile to perform optical to electrical conversion;
    a plurality of first receive optical fibers, wherein each of the first receive optical fibers is connected from one of the at least one receive OMC tile to a receive coupler, which is a star coupler;
    a second receive optical fiber, wherein the second receive optical fiber is connected from the receive coupler to one of the at least one optical connector;
    a plurality of first transmit optical fibers, wherein each of the first transmit optical fibers is connected from one of the at least one transmit OMC tile to a transmit coupler, which is a star coupler; and
    a second transmit optical fiber, wherein the second transmit optical fiber is connected from the transmit coupler to one of the at least one optical connector.

2. The system of claim 1, wherein the system further comprises:
    at least one electrical connector located on at least one of the sides of the box; and
    at least one electrical wire connected from the mother board to one of the at least one electrical connector.

3. A data bus-in-a-box (BiB), the data BiB comprising:
    at least one optical connector located on at least one side of the data BiB;
    at least one mother board housed inside of the data BiB, and comprising a transmit side and a receive side, wherein the transmit side comprises at least one transmit optical media converter (OMC) tile to perform electrical to optical conversion, and the receive side comprises at least one receive OMC tile to perform optical to electrical conversion;
    a plurality of first receive optical fibers, wherein each of the first receive optical fibers is connected from one of the at least one receive OMC tile to a receive coupler, which is a star coupler;
    a second receive optical fiber, wherein the second receive optical fiber is connected from the receive coupler to one of the at least one optical connector;
    a plurality of first transmit optical fibers, wherein each of the first transmit optical fibers is connected from one of the at least one transmit OMC tile to a transmit coupler, which is a star coupler; and
    a second transmit optical fiber, wherein the second transmit optical fiber is connected from the transmit coupler to one of the at least one optical connector.

4. The data BiB of claim 3, wherein the data BiB further comprises:
    at least one electrical connector located on at least one of the sides of the data BiB; and
    at least one electrical wire connected from the mother board to one of the at least one electrical connector.

5. The data BiB of claim 4, wherein the at least one electrical connector and the at least one optical connector are located on a same side of the data BiB.

6. The data BiB of claim 4, wherein the at least one electrical connector and the at least one optical connector are located on different sides of the data BiB.

7. The data BiB of claim 4, wherein the at least one transmit OMC tile comprises at least one spare transmit OMC tile,
    wherein the at least one receive OMC tile comprises at least one spare receive OMC tile,
    wherein the at least one electrical connector comprises at least one spare electrical connector,
    wherein when at least one of the at least one transmit OMC tile and at least one receive OMC tile fails, at least one of the at least one spare transmit OMC tile and the at least one spare receive OMC tile is connected to at least one of the at least one spare electrical connector.

8. The data BiB of claim 3, wherein at least a portion of an interior of the data BiB comprises thermally conductive foam.

9. The data BiB of claim 3, wherein each of the at least one transmit OMC tile comprises an optical sub-assembly (OSA).

10. The data BiB of claim 9, wherein the OSA is a tilted OSA.

11. The data BiB of claim 3, wherein each of the at least one receive OMC tile comprises an optical sub-assembly (OSA).

12. The data BiB of claim 11, wherein the OSA is a tilted OSA.

13. The data BiB of claim 3, wherein the data BiB is one of a 3 MCU sized box and a 4 MCU sized box.

14. The data BiB of claim 3, wherein the mother board is a double-sided printed circuit board (PCB).

15. The data BiB of claim 3, wherein the data BiB further comprises light emitting diode (LED) failure indicator lighting located on at least one side of the data BiB.

16. The data BiB of claim 3, wherein the mother board is a copper core board.

17. The data BiB of claim 3, wherein the mother board comprises an aluminum back plate.

18. A method for communication using a data bus-in-a-box (BiB), the method comprising:
- sending, at least one first receive signal, from at least one optical connector located on at least one side of the data BiB to a receive coupler,
- sending, at least one second receive signal, from the receive coupler to at least one receive optical media converter (OMC) tile located on a receive side of a mother board housed within the data BiB;
- sending, at least one first transmit signal, from at least one transmit OMC tile located on a transmit side of the mother board housed within the data BiB to a transmit coupler; and
- sending, at least one second transmit signal, from the transmit coupler to at least one of the at least one optical connector.

* * * * *